Oct. 27, 1953   A. SAXER   2,656,744
DIE ADJUSTING MECHANISM
Filed Aug. 31, 1949   2 Sheets-Sheet 1

Oct. 27, 1953

A. SAXER 2,656,744

DIE ADJUSTING MECHANISM

Filed Aug. 31, 1949

Patented Oct. 27, 1953

2,656,744

UNITED STATES PATENT OFFICE 2,656,744

DIE ADJUSTING MECHANISM

August Saxer, Thalwil, Switzerland

Application August 31, 1949, Serial No. 113,348
In Switzerland September 9, 1948

2 Claims. (Cl. 78—22)

The present invention relates to a device for the mechanical, non-cutting shaping of workpieces, especially those of axially symmetrical cross-section, whereby several hammer-like beating tools distributed along the periphery of the workpiece effect its shaping and are adjustable to the workpiece cross-section to be machined. A similar device is described for instance in U. S. A. Patent No. 2,562,643 (patent application Serial No. 767,184).

The adjusting mechanism for the beating tools may be operated, automatically or through manual control, by a mechanical, hydraulic or electrical control system. No matter what the control system may be, the purpose of the invention is to prevent transmission to this control system of the reaction forces arising in consequence of the shaping of the workpiece by the beating tools. Since in such a device the forces exerted by the beating tools amount for instance to anything up to 100 tons, it is easy to understand why the mentioned requirement is to be fulfilled. If, for instance, even only a force component of 10% is transmitted, the control system would have to take rapidly recurring blows of anything up to 10 tons; for this the machine would have to be built unreasonably solid and heavy. In order to avoid this drawback, the device is characterised in that the forces acting in the adjusting mechanism of the beating tools and also at their points of application are arranged in such a way that the reaction forces caused by the shaping of the workpiece are eliminated by the forces of the static friction between the moving parts guiding the beating tools and the stationary frame of the machine.

In the accompanying drawing three examples of execution are illustrated which serve for more precise explanation of the invention.

Figure 1:
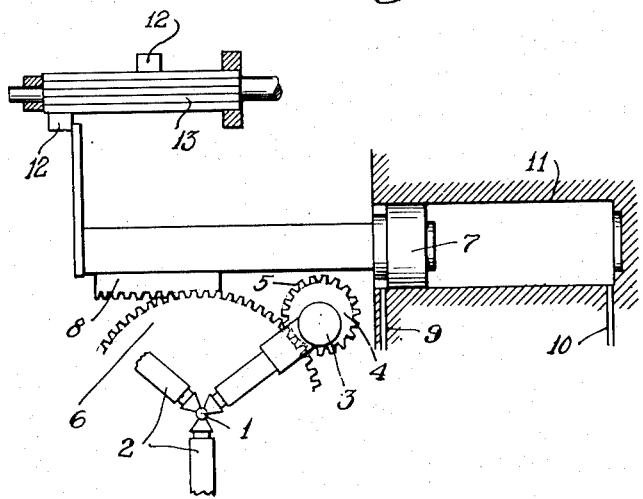
Fig. 1 shows diagrammatically the arrangement of three hammer-like beating tools, the adjusting mechanism having eccentrics.
Figure 2:
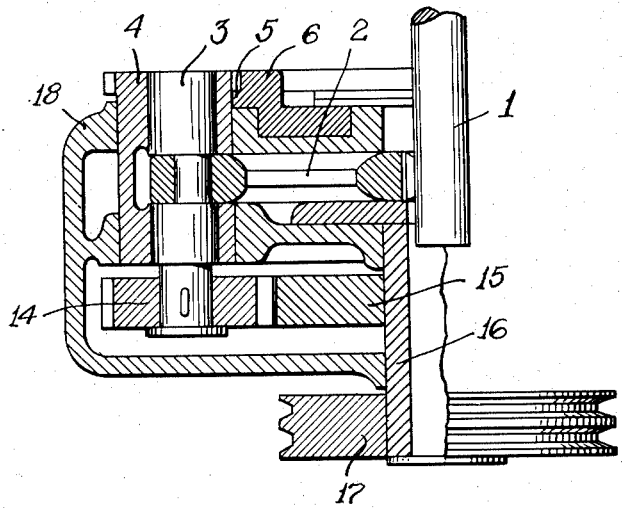
Fig. 2 shows a section through such an adjusting mechanism.

According to Fig. 1, a workpiece 1 of axially symmetrical cross-section is shaped by non-cutting methods by means of hammer-like beating tools 2. Instead of the three beating tools illustrated, only two or even four or more could be used. All beating tools are supported on crankshafts or eccentric shafts 3, which operate synchronously, so that the tools—similar to connecting rods—make reciprocating motions following quickly one after the other, thus shaping the workpiece by non-cutting methods. The workpiece may then, depending on requirements, execute an axial, or rotational, or a combined axial and rotational motion, so that circular or other shapes of cross-section are obtained. In order to be able to adjust the size of this cross-section, the eccentric shaft 3 is in its turn supported in an adjustable eccentric 4, so that the beating tools can be adjusted radially to the workpiece. On the adjusting eccentric 4, there is a set of teeth 5 which engage with a toothed adjusting ring 6. By means of a rack 8 for instance, which is connected to an hydraulic piston 7, this adjusting ring 6 can be adjusted in accordance with the liquid pressure in front of and behind the piston, whereby control liquid flows through the pipes 9 and 10 into or out of the cylinder 11. The movement of the rack 8 may be limited by adjustable stops 12 which are mounted on a control roller 13, so that a definite size of cross-section of the workpiece corresponds to each stop. Such elements of control systems are essentially known and do not form the object of the invention. As already mentioned, also quite another type of control system could be used for operating the adjusting mechanism.

The eccentric shaft 3 causing the beating movements of the tools may be driven for instance by a pinion 14, which in its turn is actuated by a central toothed wheel 15 which drives all the three illustrated beating tools synchronously. On the shaft 16 of this toothed wheel 15 a flywheel 17 is mounted which may be driven for instance by V belts from any source of power.

In order to make possible a radial adjustment of the tool 2 with respect to the workpiece 1 and thereby of the eccentric shaft 3 and the pinion 14, the gear between 14 and 15 has an abnormally deep space between the teeth, i. e. the teeth are made extra-high. The mechanism is supported in a casing 18 which forms part of the frame of the machine. From Fig. 1 it can be seen that the forces of reaction in the beating tools caused by the shaping of the workpiece attempt to rotate the adjusting eccentric 4, so that the reaction forces are transmitted to the adjusting ring 6, the rack 8 and the control system, unless means are provided to prevent such force transmission. Through adopting a special construction for the adjusting mechanism, self-locking may be obtained, based on the static friction between certain parts, so that the control system remains unloaded in any position of the mechanism.

This self-locking is explained with reference to Fig. 3.

The eccentric shaft 3 effecting the beating motion of the tools rotates in the direction shown by the arrow. That means that shaping work is done on the workpiece while one end of the connecting rod-like tool moves from A through B to C, whilst from C to A no work is done since the tool is there guided back. This direction of rotation is chosen for reasons of safety, because if the eccentric shaft 3 should happen to seize in the adjusting eccentric 4, the latter will also be turned in the indicated sense of rotation, so that the hammers are withdrawn from the workpiece and cannot knock against each other.

The force of reaction K exerts on the adjusting eccentric 4 a turning moment equal at the most to $K.e_v$, where $e_v$ represents the eccentricity of the adjusting eccentric. A further turning moment acting in the same sense is caused by the sliding bearing friction of the eccentric shaft 3 in the adjusting eccentric 4. This additional turning moment amounts to $K.\mu'.r_e$, where $\mu'$ is the coefficient of friction for sliding friction with good lubrication, and $r_e$ is the radius of the bearing pin of the eccentric shaft 3.

These two turning moments must be kept balanced, and this is done by a turning moment $R.r_v$, where R is the frictional force of the static friction between the adjusting eccentric 4 and the machine frame 18, and $r_v$ is the radius of the adjusting eccentric. Since R is equal to the normal pressure N multiplied by the coefficient of friction $\mu$ (for static friction,) the relation is:

$$K.e_v + K.\mu'.r_e = N.\mu.r_v$$

Figure 3:
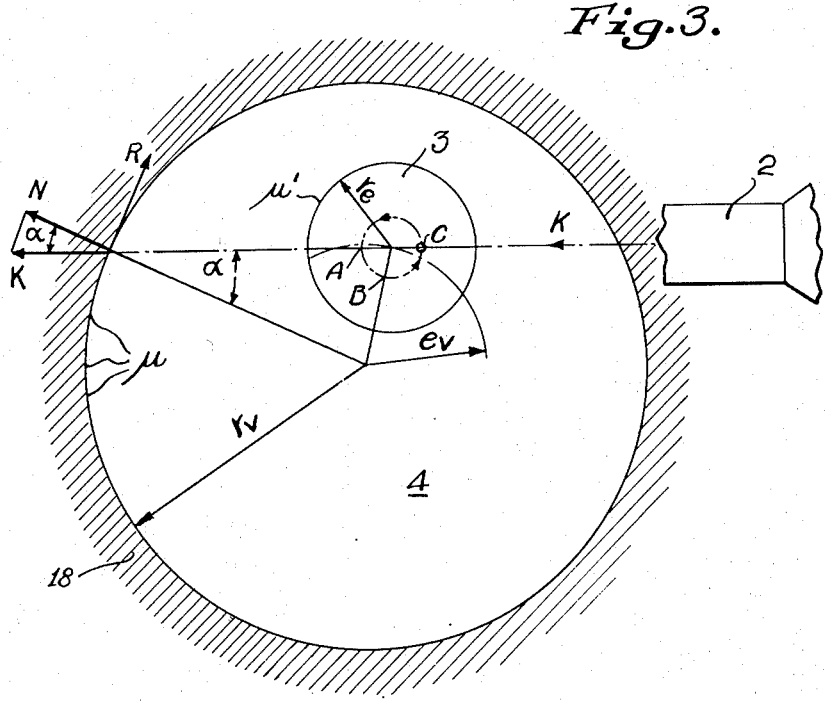
Fig. 3 shows diagrammatically the conditions in the adjusting mechanism.

As can be seen from Fig. 3, $N = K.\cos\alpha$ consequently $$K.e_v + K.\mu'.r_e = K.\cos\alpha.\mu.r_v$$

or $$\mu = \frac{e_v + \mu'.r_e}{r_v.\cos\alpha}$$

The angle $\alpha$, however, depends on $r_v$ and $e_v$, i. e.

$$\cos\alpha = \frac{\sqrt{r_v^2 - e_v^2}}{r_v}$$

or $$\mu = \frac{e_v + \mu'.r_e}{\sqrt{r_v^2 - e_v^2}}$$

This means that if the actual coefficient of friction between adjusting eccentric 4 and the machine frame 18 is greater than the values calculated by the above formula, self-locking of the adjusting mechanism is obtained with certainty.

For example, the following values in millimetres may be used:

$$e_v = 10$$
$$r_v = 115$$
$$r_e = 60$$
$$\mu' = 0.04$$

The effectively occurring coefficient of friction for static friction must then amount to at least 0.108 (calculated with the help of the above formula); this is the case for steel on steel without any lubrication. The control system thus remains unloaded, even in the most unfavourable case. Lubrication between the adjusting eccentric 4 and the machine frame is not necessary, since the adjusting movement is only very small, and the beating tools need not work during the adjusting. The forces adopted for adjusting may thus be kept within small limits; likewise the whole dimensioning of the control system.

What I claim is:

1. In apparatus for forming workpieces by a forging operation comprising a frame having a central opening for a workpiece, a plurality of eccentric journals rotatably mounted in said frame with the axes parallel to one another and to the longitudinal axis of the workpiece, said journals being uniformly distributed around the workpiece, shafts rotatably supported in said journals, an eccentric on each of said shafts, a tool carrier rotatably connected with said eccentric, a tool carried by said carrier and adapted to be reciprocated by said eccentric to strike the work and means for adjustably turning said journals to regulate the working depth of said tools, the direction of rotation of said shafts being such that the eccentric portions of said shafts are nearer the centers of the respective journals during the working strokes of the tools than during the idle return strokes and the coefficient of static friction between the eccentric journals and the frame being equal at least to $$\frac{e_v + \mu'.r_e}{\sqrt{r_v^2 - e_v^2}}$$

where $e_v$ is the eccentricity of the eccentric journals, $r_v$ is the outside radius of said journals, $r_e$ is the inside radius of said journals and $\mu'$ is the coefficient of moving friction between the shafts and said journals whereby the reaction forces on the tools are transmitted directly from the journals to the frame and are thus not transmitted back through the means for turning said journals.

2. In apparatus for forming workpieces by a forging operation comprising a frame having a central opening for a workpiece, a plurality of eccentric journals rotatably mounted in said frame with the axes parallel to one another and to the longitudinal axis of the workpiece, said journals being uniformly distributed around the workpiece, shafts rotatably supported in said journals, an eccentric on each of said shafts, a tool carrier rotatably connected with said eccentric, a tool carried by said carrier and adapted to be reciprocated by said eccentric to strike the work and means for adjustably turning said journals to regulate the working depth of said tools, the radius of said eccentric journals being greater than ten times their eccentricities and the direction of rotation of said shafts being such that the eccentric portions of said shafts are nearer the centers of the respective journals during the working strokes of the tools than during the idle return strokes so that said journals are frictionally self-locking in the frame whereby the reaction forces on the tools are transmitted directly from the journals to the frame and are thus not transmitted back through the means for turning said journals.

AUGUST SAXER.

References Cited in the file of this patent

UNITED STATES PATENTS

| Number | Name | Date |
|---|---|---|
| 526,606 | Beche | Sept. 25, 1894 |
| 637,449 | Dayton | Nov. 21, 1899 |
| 2,404,351 | Anderson | July 23, 1946 |
| 2,562,643 | Saxer | July 31, 1951 |